Aug. 13, 1940.   A. E. LECHLEITNER   2,211,334
CONTROL ARRANGEMENT FOR MAGAZINE CAMERAS
Filed Oct. 20, 1939
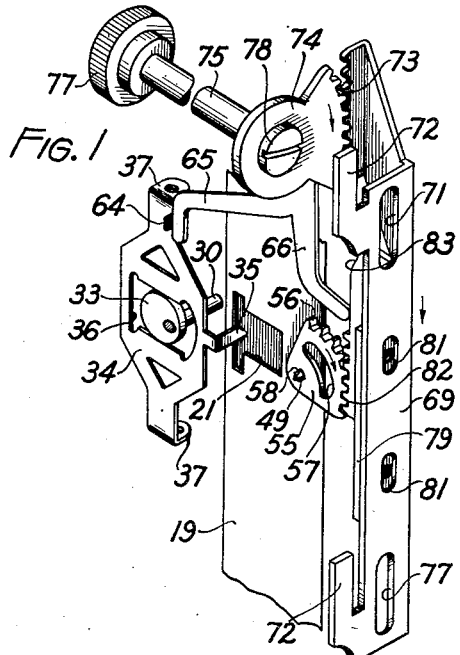
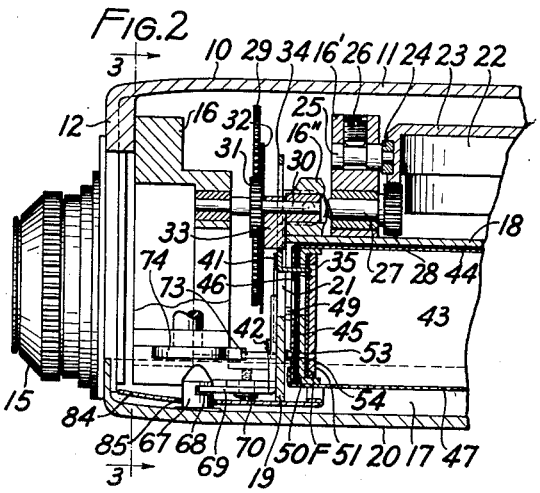
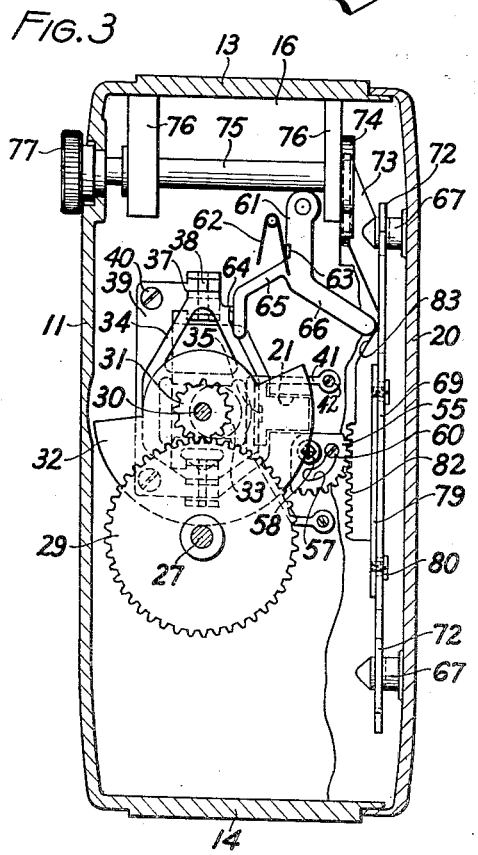
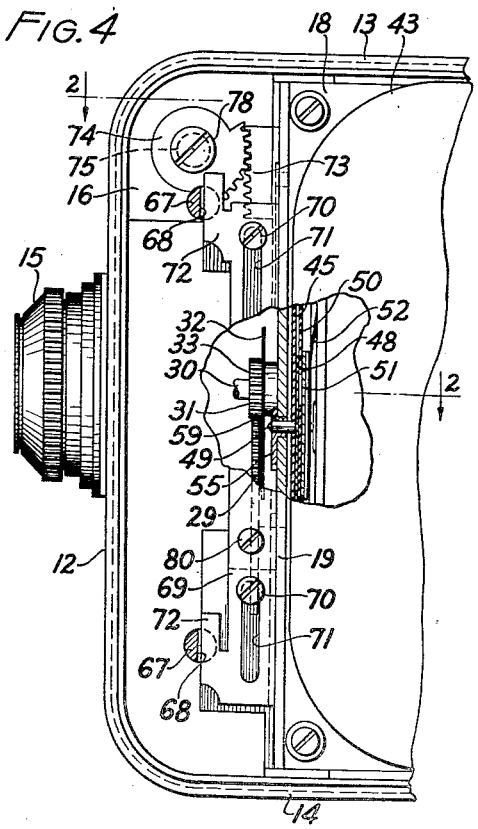
ALOYSIUS E. LECHLEITNER
INVENTOR
BY
ATTORNEYS Patented Aug. 13, 1940

2,211,334

UNITED STATES PATENT OFFICE 2,211,334

CONTROL ARRANGEMENT FOR MAGAZINE CAMERAS

Aloysius E. Lechleitner, Rochester, N. Y., assignor to Eastman Kodak Company, Rochester, N. Y., a corporation of New Jersey Application October 20, 1939, Serial No. 300,426

8 Claims. (Cl. 88—18.4)

This invention relates to a control arrangement for a photographic camera and more particularly to a motion picture camera of the magazine type.

In order to avoid fogging film at the gate of a film magazine when the same is interchanged with respect to the apparatus, it is necessary to provide a shutter means on the magazine. Such shutter means should also cover the openings in the magazine through which the film advancing claw projects. Therefore, it is desirable not only to provide an automatic means for operating the magazine shutter so that none of the film in the magazine is fogged when the magazine is inserted into or removed from the apparatus but it is also necessary to remove the film advancing claw from the corresponding opening in the magazine so that the magazine shutter can be closed.

The primary object of the present invention is the provision of a magazine camera having a cover and having a magazine shutter operating means and a film claw retractor which are operated independently of each other by a latching means for the camera cover.

Another object of the invention is the provision of a magazine shutter operator and a film claw retractor which are operated in timed relation so that the film claw is retracted from the magazine opening before the magazine shutter is closed.

A further object of the invention is the combination of a magazine shutter operator and a claw retractor operated by the latching means for the cover of the camera so that the film claw is moved out of the magazine opening before the magazine shutter is closed.

Other and further objects of the invention will be apparent from the following description.

The above objects of the invention are embodied in a magazine camera comprising the combination with a casing providing a magazine chamber for a film magazine, a cover for enclosing the magazine chamber, and a film advancing means including a claw member for entering the magazine to move a film therein, of a shutter operating means on said casing and movable to close and open a shutter on the magazine, a claw retracting means also on said casing and for withdrawing said claw member from the film magazine, and a latching means between said casing and said cover, movable to locking and unlocking positions, and for withdrawing said claw member from said magazine before the shutter operating means is moved to close the magazine shutter.

It is recognized that actuation of a shutter operating means by the latching means for the camera cover is well known and also that the magazine shutter may itself act in turn to push the advancing claw out of the magazine opening. However, the present invention is directed to operation of a magazine shutter operator and claw retractor independently of each other and in timed relation with respect to each other so that the film claw is withdrawn from the magazine opening before the magazine shutter is closed and without being engaged by said magazine shutter.

Reference is now made to the accompanying drawing wherein similar reference characters designate similar elements and wherein:

Fig. 1 is a fragmentary perspective view of the combination latching means, claw retracting means, and magazine shutter operating means.

Fig. 2 is a partial horizontal section through a motion picture camera of the magazine type equipped with the combination of the invention and taken on the line 2—2 of Fig. 4.

Fig. 3 is a vertical section taken on the line 3—3 of Fig. 2; and

Fig. 4 is a side elevation of a magazine camera equipped with the combination of the invention and having a partial section taken at the film gate.

In the illustrated embodiment of the invention, the photographic apparatus comprises a camera casing 10 having a side wall 11, a front wall 12, a top wall 13 and a bottom wall 14. An objective 15 is attached in any suitable manner to the front wall 12 or to a frame block 16 at the forward end of said casing 10.

The casing 10 provides a magazine chamber 17 which has one side formed by the longitudinal mechanism plate 18 and its front wall formed by a front plate 19 which is fastened to said frame block 16. The open side of magazine chamber 17 is enclosed by the camera cover 20 which inter-engages with the edges of the casing 10. Said front plate 19 is provided with a T-shaped opening 21 which is in alignment with the objective 15 and which has an elongated portion through which the film advancing claw may extend.

The film advancing and shutter means may be provided in the usual fashion or in the manner disclosed and now to be described. A spring motor 22 has a crown gear casing 23 provided with a peripheral groove engaged by a guide roller 23. Said guide roller 24 is rotatably mounted on the end of an eccentric stud 25 journaled in a portion of the frame block 16' and held in an adjusted position by a set screw 26. A shaft 27 is also journaled at one end in frame block 16' and at the other end at frame block 16, carries on one end a pinion 28 meshing with the crown gear casing 23 and carries on its other end a large pinion gear 29.

A countershaft 30 is also journaled at its forward end in the frame block 16 and at its rearward end in another portion of the frame block 16'', carries a pinion gear 31 meshing with the large pinion gear 29, carries a shutter blade 32 and also an eccentric 33. The film advancing means comprises a claw member 34 having a claw tooth 35 and provided with a central opening 36 for the eccentric 33. Said claw member 34 is mounted for vertical reciprocating motion and includes ears 37 engaging pins 38 in a bracket 39 mounted on the frame block 16' by screws 40. A spring member 41 is attached to the front plate 19 by screws 42 and bears against the claw tooth 35 normally to urge the same through opening 21 and into the opening of the film magazine in chamber 17, said claw tooth 35 having a beveled edge so as to be cammed out of the film perforations in a known manner upon upward movement of the claw member 34.

The film magazine may be of any standard design including a shutter for covering the film and claw openings therein. Such a film magazine 43 may comprises a casing 44 having a front lateral wall 45 provided at least with one T-shaped opening 46. The magazine casing 44 is enclosed by a cover 47. A magazine shutter 48 is mounted on a square pin 49 which extends through the front lateral wall of the magazine. This magazine shutter 48 is held against said front lateral wall 45 by a front floating gate member 50 and a pressure pad 51 urged forwardly in the magazine by a spring member 52. The film F passes between gate member 50 and pressure pad 51 and its perforations may be engaged by the claw tooth 35 for intermittent advancement thereof. The magazine shutter 48 is arranged and formed so that it is movable by square pin 49 into a closed position covering the T-shaped opening 46 in the front magazine wall 45 and may be moved into open position by rotation of square pin 49 so that an image may be projected from objective 15 through opening 21, opening 46 and a corresponding opening in front gate member 50 to the film F. The floating front gate 50 in the magazine is located in the focal plane of the objective 15 by means of a plurality of pins such as pin 53 on front plate 19 entering the magainze casing and engaging a pin 54 on the front floating gate member 50.

The magazine shutter operating means may comprise a sector 55 having a toothed periphery 56 and provided with an arcuate slot 57 and a square opening 58. The sector 55 has a bushing 59 concentric with opening 58 and journaled in front plate 19. A screw 60 passes through arcuate slot 57 and is threaded into front plate 19. As a result, the square opening 58 of sector 55 receives the square pin 49 on the magazine shutter 48 when the film magazine 43 is inserted into magazine chamber 17 and said sector 55 may be rotated to open or close said magazine shutter 48. The position of sector 55 shown in Fig. 1 corresponds to closed position of the magazine shutter 48, while the position shown in Fig. 3 corresponds to open position of said magazine shutter 48.

The claw retracting means may also be provided in any convenient manner, one form of which includes a bell crank lever 61 pivoted to frame block 16 and urged in a counter-clockwise direction as seen from Fig. 3 by a spring 62 bearing against a lug 63 on lever 61. The claw member 34 also has a lug 64 located and arranged to be engaged and moved by one arm 65 of the bell crank lever 61. The other arm 66 of bell crank lever 61 is arranged to be operated by a manually operable means or the latching means for the cover which will now be described.

The casing cover 20 carries a pair of pins 67 which are provided with slots 68. The latching means comprises a latching bar slidably mounted and manually operated by a convenient control member. According to the invention this manually operable means or latching means carries instrumentalities for actuating the magazine shutter operator and the film claw retractor independently of each other but in timed relation so that the film claw is retracted from the magazine and film therein before the magazine shutter is closed.

Said manually operable or latching means may comprise a latch bar 69 which is slidably mounted on frame block 16 by a pair of screws 70 which pass through elongated slots 71 in said latch bar 69. Projections 72 on the latch bar 69 are adapted to enter the slots 68 of the cover pins 67 and hold the cover 20 in closed position. The latch bar 69 also includes a rack portion 73 which is operated by a gear sector 74. A spindle 75 is journaled in ribs 76 of frame block 16, has one end extending to the exterior of camera casing 10 and carrying a knurled knob 77 while the gear sector 74 is mounted on the inner end of spindle 75 by a screw 78. It will now be apparent that movement of the knob 77 and gear sector 74 in the direction of the arrow, see Fig. 1, will slide the latch bar 69 downwardly and will move projections 72 into slots 68 so that the cover 20 is securely fastened to the camera casing 10. Conversely, rotation of knob 77 and gear sector 74 in the opposite direction will move projections 72 out of slots 68 of cover pins 67 so that the cover can be opened.

An intermediate means by which the magazine shutter operator and claw retractor are moved is attached to the latching means just described. Such intermediate means comprises a plate 79 adjustably attached to latch bar 69 by a pair of screws 80 which are threaded into said plate 79 and which pass through elongated apertures 81 in latch bar 69. Said plate 79 carries a gear rack 82 in mesh with the toothed periphery 56 of sector 55 and also carries a cam portion 83 located to engage the other arm 66 of bell crank lever 61. Upon movement of the latching means from the position shown in Fig. 3 to that shown in Fig. 1, the cam portion 83 moves said arm 66 of the bell crank 61 so that the arm 65 thereof moves the lug 64 of the claw member 34 to retract the claw tooth 35 from the film perforations and from the T-shaped opening 46 of the film magazine 43.

The operation of the control means according to the invention will now be described. When the magazine chamber is empty and the latching means thereof is in unlocking position, the latching means, magazine shutter operator and claw retractor are in the position illustrated in Fig. 1. The camera cover 20 may be opened and the film magazine 43 can be inserted into the magazine chamber 17. A cover plate 84 encloses the camera control elements and is provided with a pair of holes 85 for receiving the pins 67 of the cover. Said cover plate 84 also extends to the rear of front plate 19 to compel a tilting of the magazine during insertion. As the magazine is inserted its square pin 49 of the magazine shutter 48 enters the square opening 58 of sector 55. The cover 20 is then closed to enclose the magazine chamber and knob 77 is rotated to move gear sector 74 in a clockwise direction and to slide latch bar 69 downwardly so that projections 72 engage the slots 68 in cover pin 67.

At the same time gear rack 82 rotates sector 55 so that the square shutter pin 49 is turned to open the magazine shutter 48. At the end of the locking movement the cam portion 83 permits the bell crank lever 61 to move in a counter-clockwise direction so that arm 65 is moved away from the lug 64 on claw member 34 and the spring member 41 is permitted to urge claw tooth 35 through the opening 46 in the front wall of magazine 43, through a corresponding opening in the front floating gate member 50 and into engagement with the perforations of the film F. It will be noted that by virtue of the timed relation between operation of the shutter operator and claw retractor that the magazine shutter 48 is open before the claw tooth 35 is permitted to enter the magazine.

When it is desired to remove the magazine from the camera, the knob 77 and gear sector 74 are rotated in a reverse or counter-clockwise direction whereupon the cam portion 83 immediately moves bell crank 61 so that arm 65 engages and moves lug 64 to retract the claw tooth 35 from the film and opening 46 of the magazine and gear rack 82 rotates sector 55 in a counter-clockwise direction to turn the square pin 49 and to move the magazine shutter 48 into closed position. It will be noted that retraction of the claw 35 takes place before the magazine shutter 48 is closed.

Since many modifications or variations of the construction shown are possible, the scope of the invention is not to be limited to the illustrated embodiment but is defined by the appended claims.

Having now particularly described my invention what I desire to secure by Letters Patent of the United States and what I claim is:

1. In a photographic apparatus, the combination with a casing providing a magazine chamber adapted to contain a film magazine, and a film advancing means including a claw member for entering the magazine to move a film therein, of a shutter operating means on said casing and movable to close and open a shutter on the magazine, a claw retracting means on said casing and for withdrawing said claw member from the film magazine, and a manually operable means in said casing for operating said claw retracting means to withdraw said claw member from said magazine and also for moving said shutter operating means to close the magazine shutter.

2. In a photographic apparatus, the combination with a casing providing a magazine chamber adapted to contain a film magazine, a cover for enclosing said magazine chamber, and a film advancing means including a claw member for entering the magazine to move a film therein, of a shutter operating means on said casing and movable to close and open a shutter on the magazine, a claw retracting means on said casing and for withdrawing said claw member from the film magazine, a latching means between said casing and said cover and movable to locking and unlocking positions, and an intermediate means actuated by said latching means for operating said claw retracting means to withdraw said claw member from the magazine, for moving said shutter operating means to close the magazine shutter, and arranged to operate said claw retracting means and retract said claw member before said shutter operating means is moved to close the magazine shutter.

3. In a photographic apparatus, the combination with a casing providing a magazine chamber adapted to contain a film magazine, a cover for enclosing said magazine chamber, and a film advancing means including a claw member for entering the magazine to move a film therein, of a shutter operating means on said casing and movable to close and open a shutter on the magazine, a claw retracting means on said casing and for withdrawing said claw member from the film magazine, a latching means between said casing and said cover and movable to locking and unlocking positions, and an intermediate means actuated by said latching means for operating said claw retracting means to withdraw said claw member from the magazine and for moving said shutter operating means to close the magazine shutter.

4. In a photographic apparatus, the combination with a casing providing a magazine chamber adapted to contain a film magazine, a cover for enclosing said magazine chamber, and a film advancing means including a claw member for entering the magazine to move a film therein, of a shutter operating means on said casing and movable to close and open a shutter on the magazine, a claw retracting means on said casing for withdrawing said claw member from the film magazine, a latching means between said casing and said cover and movable to locking and unlocking positions, and an intermediate means actuated by said latching means for operating said claw retracting means to withdraw said claw member from the magazine, for moving said shutter operating means to close the magazine shutter, and arranged to operate said claw retracting means and retract said claw member before said shutter operating means is moved to close the magazine shutter.

5. In a photographic apparatus, the combination with a casing providing a magazine chamber adapted to contain a film magazine, a cover for enclosing said magazine chamber, and a film advancing means including a claw member for entering the magazine to move a film therein, of a shutter, operating means on said casing and movable to close and open a shutter on the magazine, a claw retracting means on said casing and for withdrawing said claw member from the film magazine, a latching means between said casing and said cover and movable to locking and unlocking positions, an intermediate means actuated by said latching means for operating said claw retracting means to withdraw said claw member from the magazine and for moving said shutter operating means to close the magazine shutter, and an adjustable connection between said latching means and said intermediate means for adjusting the timed relation therebetween.

6. In a photographic apparatus, the combination with a casing providing a magazine chamber and provided with an exposure opening, a film magazine within said chamber, provided with an exposure aperture and having a shutter movable to closed and opened positions with respect to said aperture, and a film advancing means including a claw for entering the exposure aperture of said magazine and for moving the film therein, of an operable control means in said casing, having a member for engaging and moving the shutter on said magazine, and having a second member for engaging and retracting said claw member from said magazine, said members being arranged and operated in timed relation so that said claw is retracted from the magazine before the shutter thereof is closed.

7. In a photographic apparatus, the combination with a casing having a frame member provided with an exposure opening and providing a magazine chamber adapted to contain a film magazine, a cover for enclosing said magazine chamber, and a film advancing means including a claw member resiliently urged into the magazine and for moving a film therein, of a shutter operating member rotatably mounted in said frame member, for detachably engaging a shutter member of the film magazine in said chamber, and movable to close and open such shutter member, a claw retracting member pivoted on said frame member and for moving said claw member out of said magazine, and a latching member slidable on said frame member to locking and unlocking positions, having a portion for rotating said shutter operating member, and having a portion for pivoting said claw retracting member, said portions being located on said latching member so that, upon movement thereof to unlocking position, said claw retracting member is pivoted to remove the claw member from the magazine before said shutter operating member is rotated to close the shutter on the magazine.

8. In a photographic apparatus, the combination with a casing having a frame member provided with an enclosure opening and providing a magazine chamber adapted to contain a film magazine, a cover for enclosing said magazine chamber, and a film advancing means including a claw member resiliently urged into the magazine and for moving a film therein, of a shutter operating member rotatably mounted in said frame member, having a circular toothed sector for detachably engaging a shutter member of the film magazine in said chamber, and movable to close and open such shutter member, a claw retracting bellcrank pivoted on said frame member having an arm for moving said claw member to retract the same from said magazine, and a latching member slidable on said frame member to locking and unlocking positions, having a rack portion for engaging the toothed sector of said shutter operating member, and having a cam portion for engaging the other arm of said claw retracting bell-crank and located so that, upon movement of the latching member to unlocking position, said bellcrank is moved to retract said claw member from the magazine before said rack portion rotates said shutter operating member to close the shutter of the magazine.

ALOYSIUS E. LECHLEITNER.

Disclaimer 2,211,334.—*Aloysius E. Lechleitner*, Rochester, N. Y. CONTROL ARRANGEMENT FOR MAGAZINE CAMERAS. Patent dated Aug. 13, 1940. Disclaimer filed July 29, 1949, by the assignee, *Eastman Kodak Company*.

Hereby enters this disclaimer to claims 1 to 8, inclusive, of said patent.

[*Official Gazette Aug. 30, 1949.*]